United States Patent
Hartman et al.

(10) Patent No.: US 9,554,515 B1
(45) Date of Patent: Jan. 31, 2017

(54) BELT PICKUP WITH DRIVE SYSTEM

(71) Applicant: Deere & Company, Moline, IL (US)

(72) Inventors: Jacob P. Hartman, Moline, IL (US); Nathaniel R. Bernklau, Davenport, IA (US); Nathan E. Krehbiel, Bettendorf, IA (US)

(*) Notice: Subject to any disclaimer, the term of this patent is extended or adjusted under 35 U.S.C. 154(b) by 0 days.

(21) Appl. No.: 14/878,123

(22) Filed: Oct. 8, 2015

(51) Int. Cl.
*A01D 41/127* (2006.01)
*A01D 89/00* (2006.01)

(52) U.S. Cl.
CPC ......... *A01D 89/005* (2013.01); *A01D 41/1274* (2013.01); *A01D 89/002* (2013.01); *A01D 89/003* (2013.01)

(58) Field of Classification Search
CPC ...... A01D 57/20; A01D 45/006; A01D 61/02; A01D 61/008; A01D 61/00; A01D 89/005; A01D 89/004; A01D 89/003; A01D 89/002; A01D 41/10; A01D 41/1274; A01D 41/142; A01D 69/005; A01D 69/06; A01F 15/07; A01F 15/106; A01F 2015/0775; A01F 2015/077
USPC ...... 171/14, 27; 56/208, 364, 377, 341, 345; 100/88; 460/6; 198/510.1, 520, 693, 697
See application file for complete search history.

(56) References Cited

U.S. PATENT DOCUMENTS

| | | | | |
|---|---|---|---|---|
| 5,255,501 A * | 10/1993 | McWilliams | ........... | A01F 15/07 100/88 |
| 7,555,882 B2 * | 7/2009 | Clauss | ................ | A01D 41/142 56/10.2 G |
| 7,866,136 B1 * | 1/2011 | Hill | ........................ | A01D 57/20 56/364 |
| 8,266,881 B2 * | 9/2012 | McIlwain | ............ | A01D 89/005 56/208 |
| 8,286,412 B2 * | 10/2012 | Kidd | .................... | A01D 89/001 56/345 |
| 2007/0000226 A1 * | 1/2007 | Grywacheski | ......... | A01D 57/20 56/364 |

* cited by examiner

*Primary Examiner* — Robert Pezzuto

(57) ABSTRACT

A belt pickup (100) with drive system (130) includes a frame (102); a pickup conveyor (106) supported on the frame (102), a transfer conveyor (108) supported on the frame (102), wherein the drive system (130) includes a motor (132) coupled to a drive roller of the transfer conveyor (108), a first pulley (134) driven by the motor (132), a first drive belt (136) driven by the first pulley (134), a second pulley (138) driven by the first drive belt (136), a third pulley (140) fixed to the second pulley (138) and driven by the second pulley (138), a second drive belt (142) driven by the third pulley (140), and a fourth pulley (144) coupled to a drive roller (112) of the pickup conveyor (106).

8 Claims, 4 Drawing Sheets

BELT PICKUP WITH DRIVE SYSTEM

FIELD OF THE INVENTION

This invention relates to belt pickups for agricultural combines. More particularly it relates to drive systems for belt pickups.

BACKGROUND OF THE INVENTION

Belt pickups for agricultural combines are agricultural harvesting heads that gather previously cut crop plants that have been gathered into windrows. Belt pickups typically have a pickup conveyor that picks the cut crop up from the ground, a transfer conveyor disposed behind the pickup conveyor that transfers the cut crop material from the pickup conveyor to an auger conveyor, and an auger conveyor that receives the cut crop material from the transfer conveyor, gathers the cut crop material in from the sides of the belt pickup and sends it through a central aperture in the rear of the frame of the belt pickup.

The cut crop material passing through the central aperture is transmitted to a belt conveyor in the feeder house that extends forward from the front end of an agricultural combine. The feeder house conveys the cut crop material into the body of the agricultural combine where it is threshed, separated, cleaned, and the grain portion of the cut crop material is stored in a grain tank.

One problem with this arrangement is that the pickup conveyor and the transfer conveyor are driven by separate hydraulic motors.

What is needed, therefore, is a drive system for a belt pickup that permits a single motor to efficiently drive both the pickup conveyor and the transfer conveyor.

SUMMARY OF THE INVENTION

In accordance with a first aspect of the invention, a belt pickup with a drive system comprises: a frame; a pickup conveyor supported on the frame, the pickup conveyor comprising a first endless conveyor belt the first endless conveyor belt having a plurality of fingers fixed to the first endless conveyor belt and extending outward from the first endless conveyor belt, wherein the plurality of fingers are disposed to lift cut crop material onto an upper surface of the first endless conveyor belt as the belt pickup travels through the field harvesting crop, and wherein the pickup conveyor further comprises a first drive roller and a first idler roller that support the first endless conveyor belt for recirculating movement about the first drive roller and the first idler roller; a transfer conveyor supported on the frame, wherein the transfer conveyor is disposed behind the pickup conveyor to receive cut crop material therefrom, and wherein the transfer conveyor further comprises a second endless conveyor belt supported for recirculating movement about a second drive roller and a second idler roller; and the drive system comprising a motor coupled to the second drive roller to drive the second drive roller, a first pulley coupled to the motor and driven by the motor, a first endless drive belt coupled to the first pulley and driven by the first pulley, a second pulley coupled to and driven in rotation by the first endless drive belt, a third pulley fixed to the second pulley and driven in rotation by the second pulley, a second endless drive belt coupled to and driven by the third pulley, and a fourth pulley fixed to the first drive roller to drive the drive roller in rotation.

The belt pickup may further comprise a first mechanical link disposed to support the second pulley and the third pulley for free rotation.

The belt pickup may further comprise a second mechanical link pivotally coupled to the first mechanical link to support the first mechanical link and to permit the first mechanical link to pivot with respect to the second mechanical link The second mechanical link may be pivotally coupled to the frame at a pivot joint to permit the second mechanical link to pivot with respect to the frame.

The belt pickup may further comprise a spring that is coupled to the frame and is coupled to the second mechanical link to apply a spring force to the second mechanical link and tension the first endless drive belt and the second endless drive belt.

The second pulley and the third pulley may be fixed to a shaft that extends through a hole formed in a lower end of the first mechanical link.

The shaft may be supported for free rotation in the hole.

The first mechanical link and the second mechanical link may be generally disposed at a right angle with respect to each other.

DETAILED DESCRIPTION OF THE DRAWINGS

Figure 1:
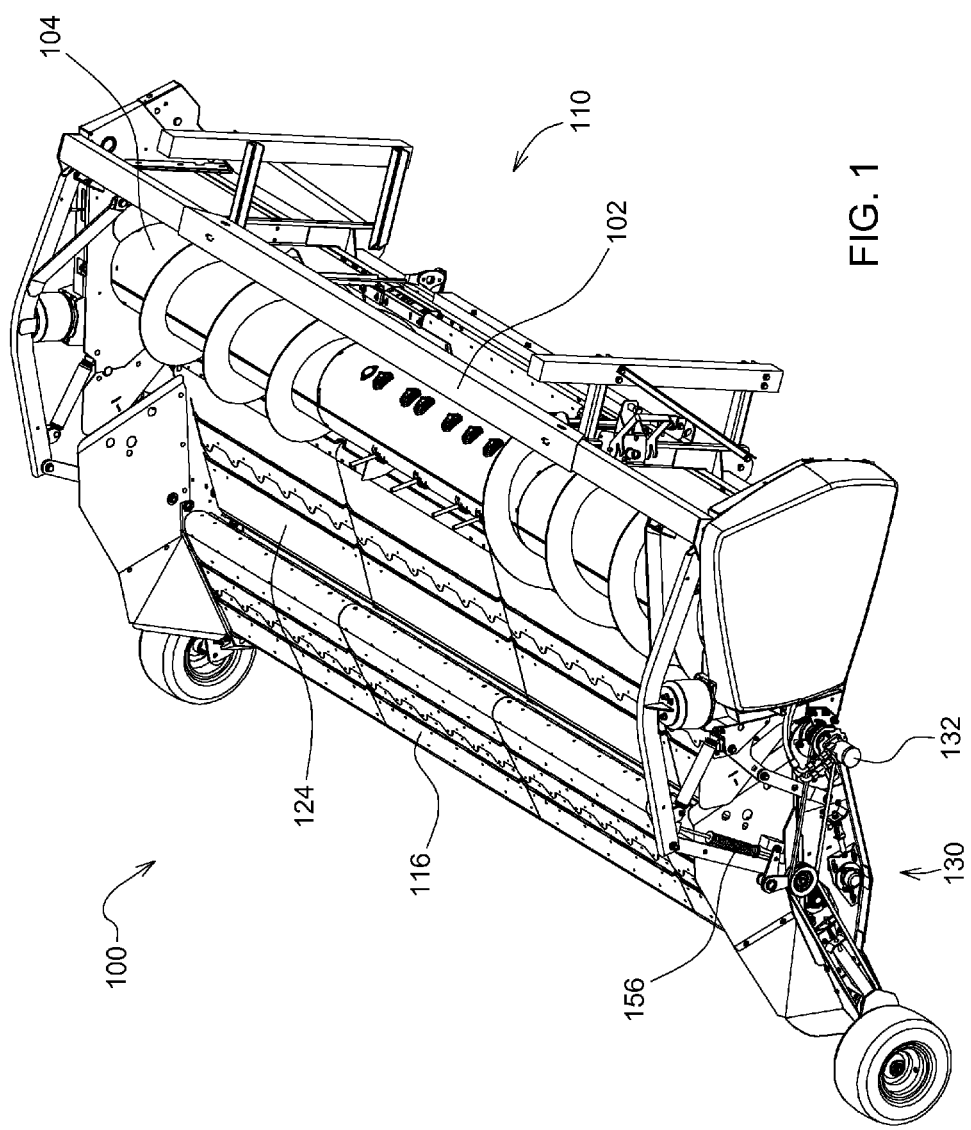
FIG. 1 is a rear perspective view of a belt pickup in accordance with the present invention.
Figure 2:
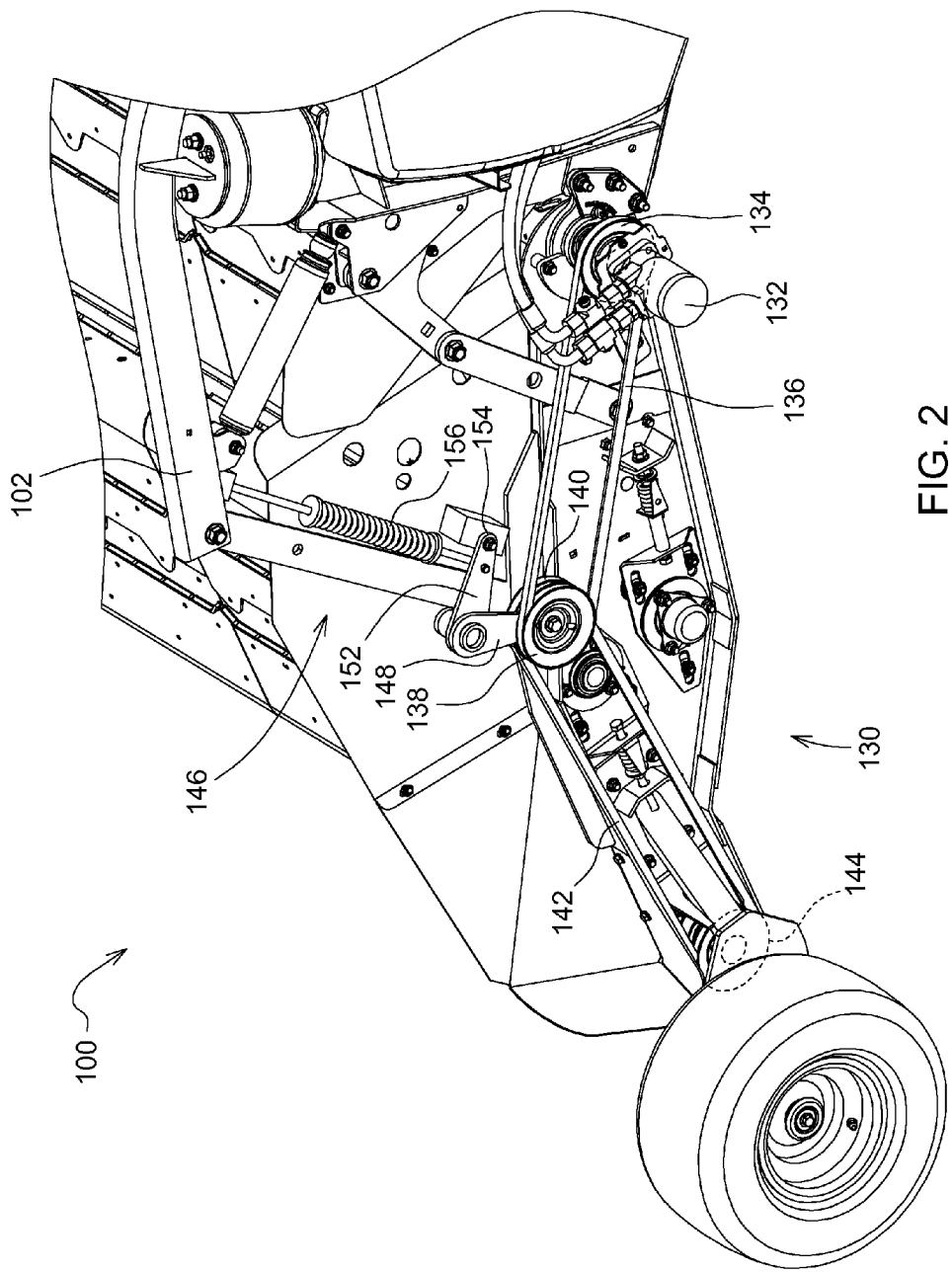
FIG. 2 is a fragmentary rear perspective view of the belt pickup of FIG. 1.
Figure 3:
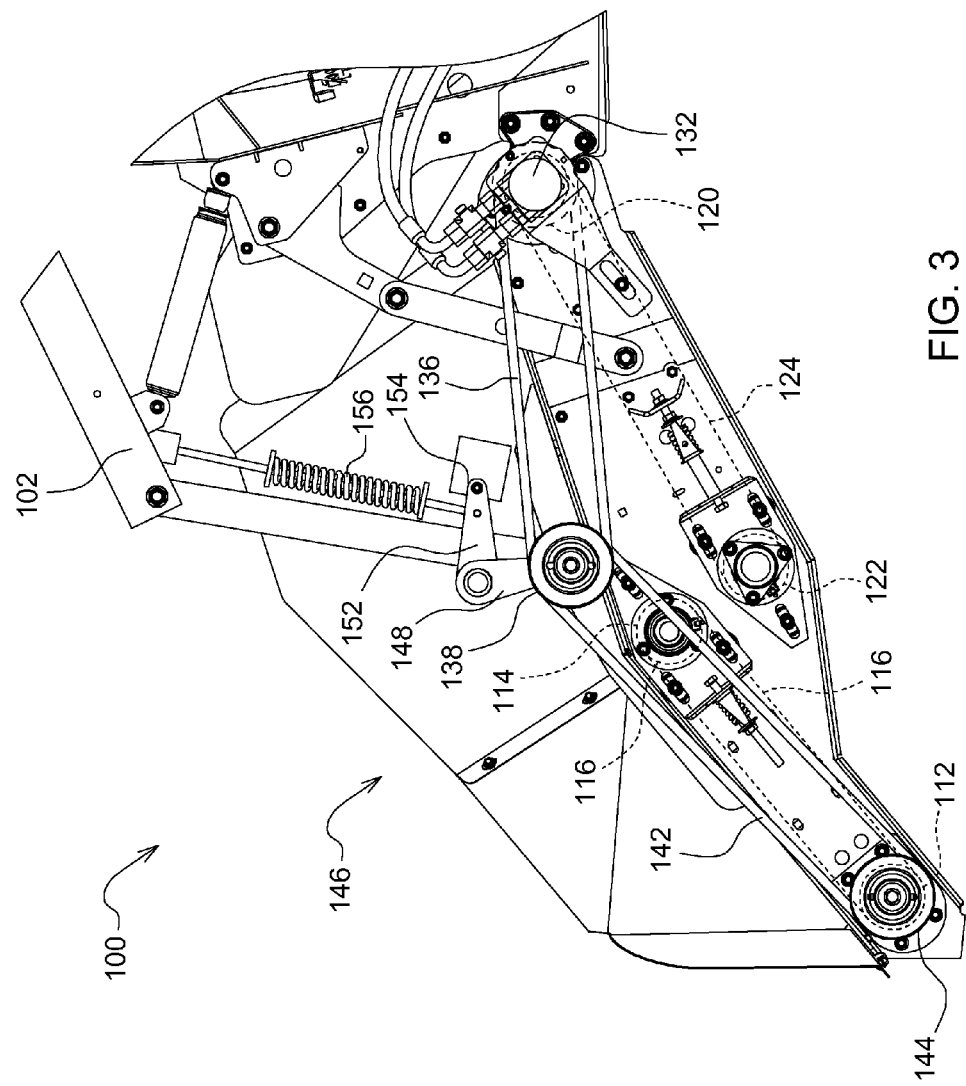
FIG. 3 is a side view of the fragmentary view of FIG. 2.
Figure 4:
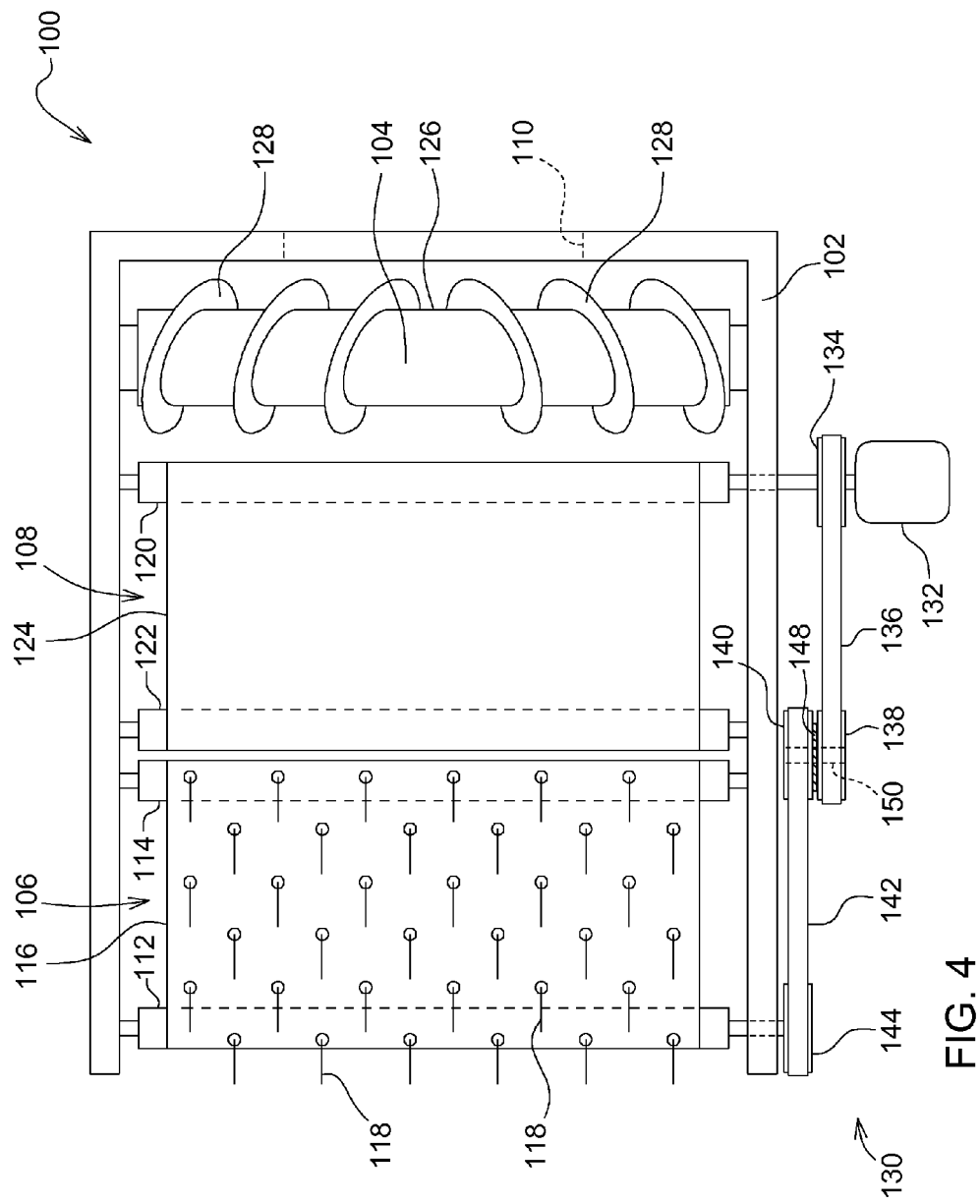
FIG. 4 is a schematic top view of the belt pickup of FIGS. 1-3.

Referring to the Figures, a belt pickup 100 comprises a frame 102 on which are supported an auger conveyor 104, a pickup conveyor 106, and a transfer conveyor 108 and a drive system 130.

The pickup conveyor 106 comprises a drive roller 112, an idler roller 114, and an endless conveyor belt 116 to which a plurality of fingers 118 are attached. The endless conveyor belt 116 is supported on the drive roller 112 and the idler roller 114 for recirculating movement. As the endless conveyor belt 116 circulates about the rollers, the plurality of fingers 118 engage the cut crop material laying on the ground, pick it up, and deposit it on the upwardly facing surface of the endless conveyor belt 116. The endless conveyor belt 116 carries the cut crop material rearward. The endless conveyor belt 116 is made of elastomer impregnated fabric.

The transfer conveyor 108 comprises a drive roller 120, and idler roller 122, and an endless conveyor belt 124. The endless conveyor belt 124 is supported on the drive roller 120 and the idler roller 122 for recirculating movement. As the endless conveyor belt 124 circulates about the rollers, the endless conveyor belt 124 receives the cut crop material from the endless conveyor belt 116 of the pickup conveyor 106. The endless conveyor belt 124 carries the cut crop material rearward. The endless conveyor belt 124 is made of elastomer impregnated fabric.

The auger conveyor 104 comprises an elongate cylindrical drum 126 supported on the frame 102. The elongate cylindrical drum 126 has spiral flights 128 affixed to each end of the cylindrical drum 126. The spiral flights 128 draw cut crop material inward to a central region of the frame 102 when the auger conveyor is driven in a direction for harvesting crop.

As the auger conveyor 104 rotates, it receives the cut crop material from the endless conveyor belt 124 of the transfer conveyor 108, draws it inward from both sides of the endless conveyor belt 124 to a central region of the elongate cylindrical drum 126, and conveys the cut crop material rearward through a central aperture 110 in the frame 102. The central aperture 110 is provided in the rear of the frame 102 to communicate cut crop through the frame 102 and into the feeder house (not shown) of the agricultural combine (not shown) which supports the belt pickup 100.

The pickup conveyor 106 and the transfer conveyor 108 are coupled to and driven by the drive system 130. The drive system 130 comprises a motor 132 coupled to the drive roller 120 to drive the drive roller 120 in rotation, a pulley 134 coupled to the motor 132 to be driven in rotation by the motor 132, an endless drive belt 136 coupled to the pulley 134 to be driven by the pulley 134, a pulley 138 driven in rotation by the endless drive belt 136, a pulley 140 fixed to the pulley 138 to be driven in rotation by the pulley 138, an endless drive belt 142 driven by the pulley 140, and a pulley 144 fixed to the drive roller 112 to drive the drive roller 112 in rotation.

In this manner, the motor 132 drives the drive roller 120 directly, and drives the drive roller 112 through a series of endless drive belts and pulleys.

A mechanism 146 is provided to support the pulley 138 and the pulley 140, and to tension the endless drive belt 136 and the endless drive belt 142 by deflecting the pulley 138 and the pulley 140 upward. The tension in the endless drive belt 136 and the endless drive belt 142 increases the friction between the endless drive belts and the pulleys on which they are supported, and therefore permits power to be communicated from the motor 132 to the pulley 144, and thence to the drive roller 112.

The mechanism 146 comprises a first mechanical link 148. The first mechanical link 148 supports a shaft 150 on which the pulley 138 and the pulley 140 are fixed.

The lower end of the first mechanical link 148 has a hole through which the shaft 150 extends. The shaft 150 is free to rotate in the hole. The pulley 138 is fixed on one end of the shaft 150 and the pulley 140 is fixed on the other end of the shaft 150. The pulley 138 and the pulley 140 are fixed to the shaft 150, and thus rotate together. They are free to rotate with respect to the first mechanical link 148.

The upper end of the first mechanical link 148 is pivotally coupled to a first end of a second mechanical link 152. The first mechanical link 148 is free to pivot with respect to the second mechanical link 152. A second end of the second mechanical link 152 is coupled to the frame 102 of the belt pickup 100 at a pivot joint 154. The second mechanical link 152 is free to pivot with respect to the frame 102 about the pivot joint 154.

The first mechanical link 148 and the second mechanical link 152 generally extend at a right angle with respect to each other. Thus, as the second mechanical link 152 pivots about the pivot joint 154, the first mechanical link 148 translates vertically.

A spring 156 is coupled to the frame 102 of the belt pickup 100 at a first end of the spring 156. A second end of the spring 156 is coupled to the second mechanical link 152 at a point between the first end and the second end of the second mechanical link. The spring 156 applies an upward force to the second mechanical link 152. This upward force is communicated to the upper end of the first mechanical link 148. The upward force is communicated through the first mechanical link 148, the shaft 150, and the pulley 138 and the pulley 140.

The upward force lifts the pulley 138 and the pulley 140 until it is resisted by a counteracting tension in the endless drive belt 136 and the endless drive belt 142. The counteracting tension in the endless drive belt 136 and the endless drive belt 142 is applied, in turn, to pulley 134 and pulley 144.

The claims define the invention, which is not limited to the specific embodiment or embodiments described herein. Obvious variations of the specific embodiments shown herein will be apparent to one skilled in the art.

We claim:

1. A belt pickup (100) with drive system (130) comprising:
   a frame (102);
   a pickup conveyor (106) supported on the frame (102), the pickup conveyor (106) comprising a first endless conveyor belt (116) the first endless conveyor belt (116) having a plurality of fingers (118) fixed to the first endless conveyor belt (116) and extending outward from the first endless conveyor belt (116), wherein the plurality of fingers (118) are disposed to lift cut crop material onto an upper surface of the first endless conveyor belt (116) as the belt pickup (100) travels through the field harvesting crop, and wherein the pickup conveyor (106) further comprises a first drive roller (112) and a first idler roller (114) that support the first endless conveyor belt (116) for recirculating movement about the first drive roller (112) and the first idler roller (114);
   a transfer conveyor (108) supported on the frame (102), wherein the transfer conveyor (108) is disposed behind the pickup conveyor (106) to receive cut crop material therefrom, and wherein the transfer conveyor (108) further comprises a second endless conveyor belt (124) supported for recirculating movement about a second drive roller (120) and a second idler roller (122); and
   the drive system (130) comprising a motor (132) coupled to the second drive roller (120) to drive the second drive roller (120), a first pulley (134) coupled to the motor (132) and driven by the motor (132), a first endless drive belt (136) coupled to the first pulley (134) and driven by the first pulley (134), a second pulley (138) coupled to and driven in rotation by the first endless drive belt (136), a third pulley (140) fixed to the second pulley (138) and driven in rotation by the second pulley (138), a second endless drive belt (142) coupled to and driven by the third pulley (140), and a fourth pulley (144) fixed to the first drive roller (112) to drive the drive roller (112) in rotation.

2. The belt pickup (100) with drive system (130) of claim 1, further comprising a first mechanical link (148) disposed to support the second pulley (138) and the third pulley (140) for free rotation.

3. The belt pickup (100) with drive system (130) of claim 2, further comprising a second mechanical link (152) pivotally coupled to the first mechanical link (148) to support the first mechanical link and to permit the first mechanical link (148) to pivot with respect to the second mechanical link (152).

4. The belt pickup (100) with drive system (130) of claim 3, wherein the second mechanical link (152) is pivotally coupled to the frame (102) at a pivot joint (154) to permit the second mechanical link (152) to pivot with respect to the frame (102).

5. The belt pickup (100) with drive system (130) of claim 4, further comprising a spring (156) that is coupled to the frame (102) and is coupled to the second mechanical link (152) to apply a spring force to the second mechanical link and tension the first endless drive belt (136) and the second endless drive belt (142).

6. The belt pickup (100) with drive system (130) of claim 2, wherein the second pulley (138) and the third pulley (140) are fixed to a shaft (150) that extends through a hole formed in a lower end of the first mechanical link (148).

7. The belt pickup (100) with drive system (130) of claim 6, wherein the shaft (150) is supported for free rotation in the hole.

8. The belt pickup (100) with drive system (130) of claim 3, wherein the first mechanical link (148) and the second mechanical link (152) are generally disposed at a right angle with respect to each other.

\* \* \* \* \*